April 8, 1969   A. G. OFFENBROICH   3,437,362
EXPANDING DEVICES

Filed Oct. 17, 1966

INVENTOR:
ADRIAN G. OFFENBROICH
Browne, Schuyler + Beveridge
ATTORNEYS

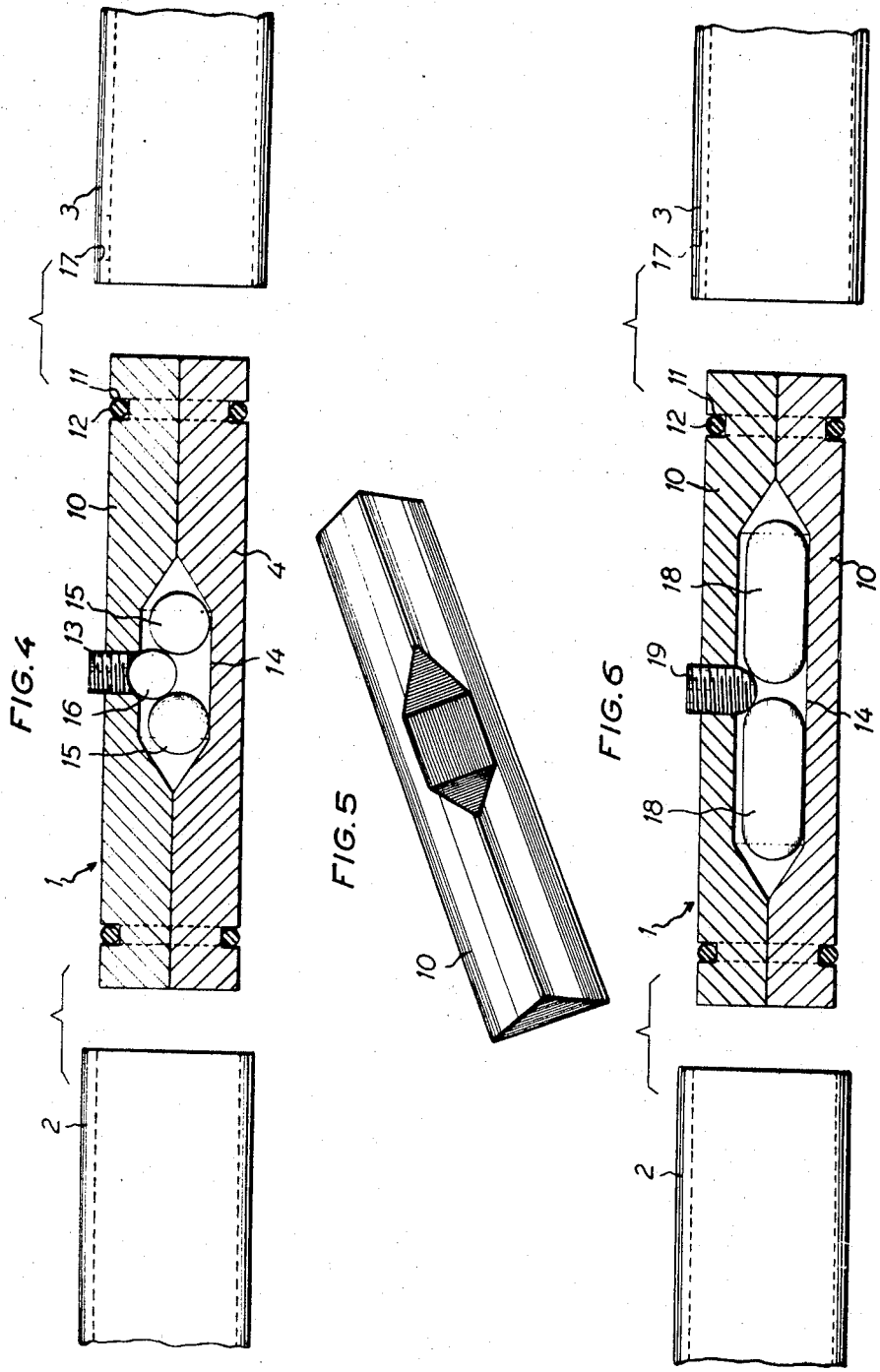

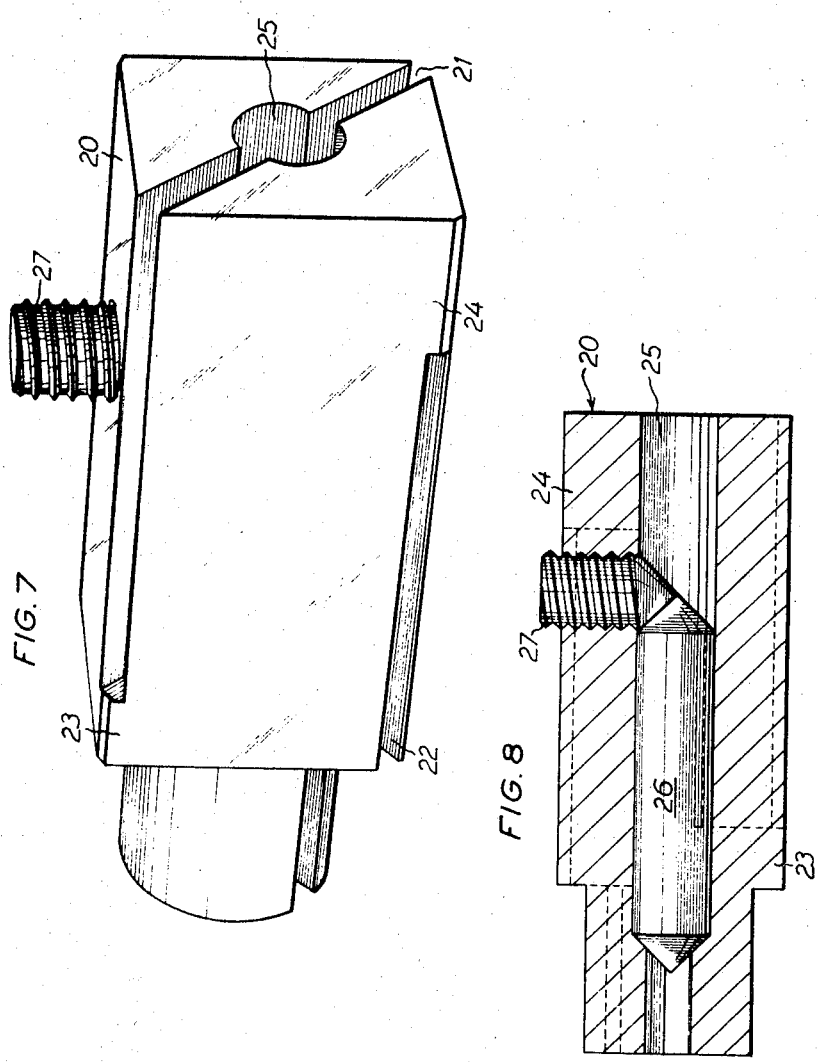

United States Patent Office
3,437,362
Patented Apr. 8, 1969

3,437,362
EXPANDING DEVICES
Adrian Gottfried Offenbroich, Sodra Forstadsgatan 49, Malmö, Sweden
Filed Oct. 17, 1966, Ser. No. 587,205
Claims priority, application Sweden, Mar. 20, 1965, 3,628/65
Int. Cl. F16b 7/00; F16d 1/00
U.S. Cl. 287—124                                         4 Claims

ABSTRACT OF THE DISCLOSURE

An expanding device including at least two expandable parts received in a passage of a structural member for radial movement into engagement with the structural member. An expander element is slidably received between the expandable parts for camming engagement with cam surfaces formed on the expandable parts at an angle to the axis of the passage. An actuator extends through the structural member at an angle to the axis of the passage for engaging the expander element to slide it into engagement with the cam surfaces and thus move the expandable parts outwardly into engagement with the structural member.

---

This invention relates to an expanding device for interconnecting and interlocking hollow structural elements.

One is often faced with the problem of interconnecting and interlocking hollow structural elements in a simple, speedy and reliable manner to permit erection of constructions having fixed, but still detachable connections. Such interconnection and interlocking is desirable for example when tubular elements are assembled to form stands of various shapes and sizes for display facilities, supports for shelving, etc. In these cases great demands are put on the appearance of the construction; above all, the connections between the tubular elements should not be visible. To interconnect the elements by means of sleeves in which the tube ends are inserted and locked with the aid of screws, thus is not very suitable. For the interconnection of the tubular elements use has therefore been made of connecting pieces which are of a cross-sectional shape conforming to the bores of the tubes and have projecting portions which, upon pushing or striking the tubular elements onto the connecting piece with the aid of a suitable tool for their interconnection, will engage the walls of the tubes thereby keeping the tubular elements together. The connecting pieces, however, after repeated use will wear out, providing but a loose fit and as a consequence unreliable interlocking of the tubular elements.

For these reasons, said interconnection should be realized with the aid of an expanding device which in such a case will have to permit lateral control. Also the expanding device should be designed for the interconnection of structural elements having bores of any cross-sectional shape whatever as well as of structural elements having bores of differing cross-sectional shape. Further, it should be possible to bring the ends of the tubular elements into fully abutting relationship, unimpeded by the expanding device.

The present invention provides an expanding device that satisfies all of the above requirements. It is characterised by the combination that the device comprises a member insertable in the bores of the structural elements and divided at least over part of its length along longitudinally extending and intersecting planes of division into two or more parts, the portion of said member insertable in the respective bore having substantially the same cross-sectional shape as the respective bore, and that the parts of said member are arranged to be spread apart by means of screws directed transversely of the line of intersection of the dividing planes, threadedly engaging one of said parts and applied directly or by the intermediary of one or more spreading-apart means against the other parts in order, when tightened, to move the parts into engagement with the walls of the bores of the structural elements.

In certain embodiments of the invention, the radially expandable parts have oppositely positioned cam surfaces while the intermediate spreading means may be comprised of balls or pins engageable with these cam surfaces to radially expand the parts. Additionally the screw is radially threaded into one of the expandable parts and in certain embodiments directly engages the spreading pin or pins to force them into engagement with the cam surfaces. In the embodiment which employs balls for engaging the cam surfaces, a third ball may be interposed to be engaged by the screw for distributing pressure to the balls and in turn the cam surfaces.

Although expanding devices of this type can serve other purposes they are especially suited ot keep together a stand assembly composed of parts in the form of tubular elements and connecting elements having holes, the parts of said assembly being in end-to-end abutting relationship and interconnected by means of expanding devices according to the present invention which extend between the bores of the parts of the stand assembly, and the walls of said parts having openings registering with the screws of the expanding devices.

By designing the connecting elements as T-shaped tubes the stand assembly can be erected in almost any desirable manner. Due to the possibility of moving the tubular elements and the connecting elements into fully abutting relationship the stand assembly will be continuous and have a pleasant appearance; at the same time it is both reliable and stable.

These and further features of the invention will be described more closely in the following with reference to the accompanying drawings. In the drawings:

FIG. 4 shows in section another embodiment of an expanding device that comprises four parts;

FIG. 5 shows one of the four parts of the expanding device in FIG. 4;

FIG. 6 in a section corresponding to FIG. 4 shows a further embodiment of an expanding device;

FIG. 7 in perspective view shows still another embodiment of an expanding device;

FIG. 8 shows the embodiment of FIG. 7 in section; and

Figure 9:
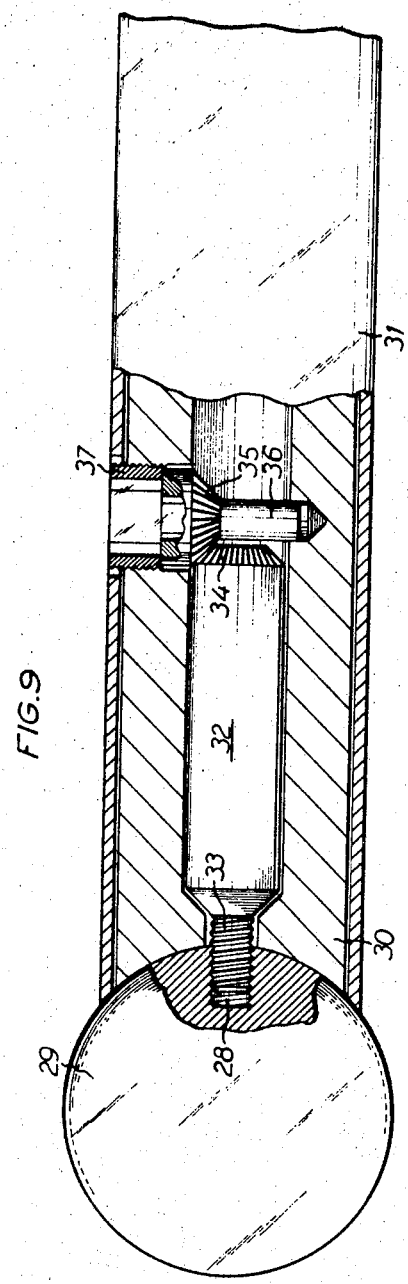

FIG. 9 partly in section shows a modification of the expanding device.

Figure 1:
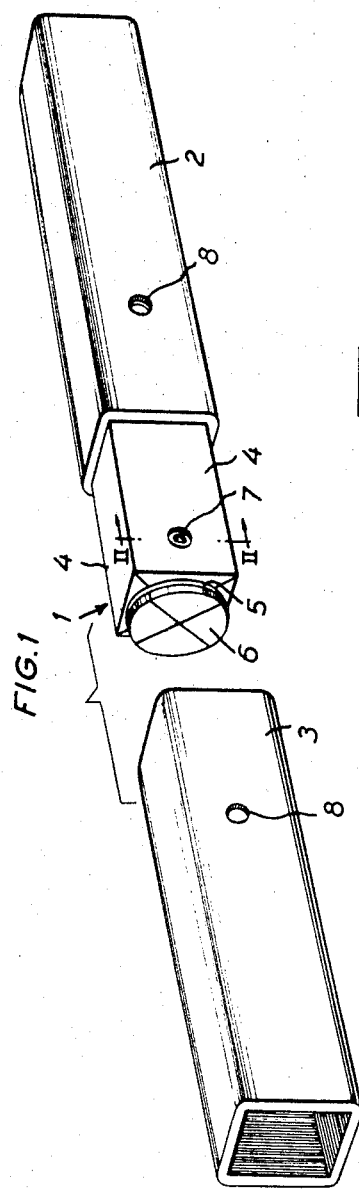
FIG. 1 shows an expanding device inserted in the end portion of a tubular element.
Figure 2:
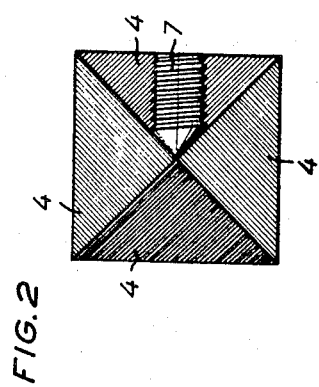
FIG. 2 shows a cross section of the expanding device on line II—II in FIG. 1.

In FIG. 1 is shown an expanding device 1 constructed in accordance with the invention. One half of the device is inserted in the tubular element 2 while the other half is to be inserted in another tubular element 3 in order after expansion to connect the tubular elements together. The expanding device is composed of four parts 4 which together constitute a member of a cross-sectional shape, in the present instance square, corresponding to that of the tubular elements 2 and 3. The parts 4 are resiliently held together by spring clips 5 mounted in peripheral grooves in round portions 6 projecting from the ends of said member. The expanding device 1 is expanded with the aid of screws 7 which are screwed into threaded holes in one of the parts of said member and have their points bearing against the other parts 4. In order that the bearing engagement shall be as exact as possible the points of the screws 7 shall have, as will appear from FIG. 2, substantially the same angle as that between the inwardly directed surfaces of the part 4 in which the screws 7 are provided. The screws at their outer ends have a hexagon hole for a key to be inserted in the hole through an opening 8 in the tubular elements 2 and 3. When the tubular elements 2 and 3 to be interconnected have been passed onto the expanding device 1 and are in end-to-end abutting relationship the openings in the tubular elements 2 and 3 register with the screws 7 which can thus be screwed inwards by means of a hexagon key to spread apart the parts 4 into engagement with the walls of the tubular elements 2 and 3, whereby said elements are interconnected. There is obtained in this way between the elements a connection totally devoid of projecting parts, said connection being invisible from outside, except for the openings 8 in the tubular elements. The connection will be exceptionally strong and stable due to the expanding device 1 bearing against substantially the entire surface of the inner walls of the tubular elements 2 and 3 at the end portions thereof.

Figure 3:
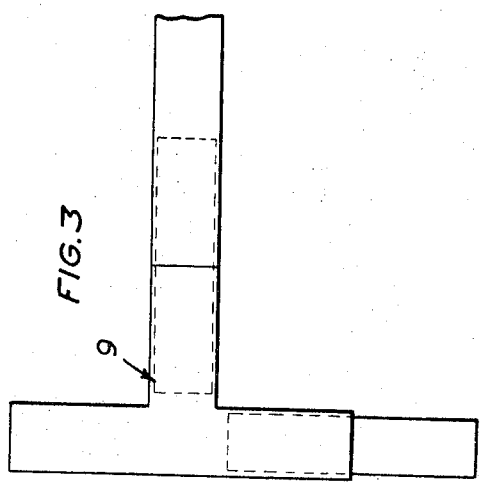
FIG. 3 shows part of a stand assembly composed of parts connected together by means of expanding devices.

For the assembly of stand assemblies and the like units for display and exhibition purposes or of supporting frames for shelving use is made of connecting elements 9 (FIG. 3) in the shape of T-tubes or of other suitable shape. These connecting elements comprise suitably welded-together tube parts of the same cross-sectional shape as that of the tubular elements. From a number of tubular elements, connecting elements 9 and expanding devices 1, it is thus possible to erect stand assemblies, scaffolding and the like structures in a great many different ways. This is advantageous, particularly in display work when the appearance of the construction often has to be altered.

The expanding device according to the invention, of course, can be designed in a great many other ways and be employed for other purposes than the one described herein. When the expanding device is to be used for interconnection and interlocking round tubes it is given round cross-sectional shape and its parts will then have the shape of circle sectors.

FIG. 4 shows another embodiment of a tubular expanding device 1 constructed in accordance with the invention. One half of the device is to be inserted in a tubular element 2 and the other half in another tubular element 3 to interconnect and interlock said tubular elements after expansion of the device. The expanding device comprises four parts 10 which together form a member of a cross-sectional shape, in the present instance square, corresponding to that of the tubular elements 2 and 3. The parts 10 are kept together by means of spring clips 12 disposed in grooves 11 at the ends of the parts 10. The expanding device is expanded with the aid of a screw 13 and means 15, 15 arranged in a chamber 14 in the member for spreading apart said parts 10. The chamber is wholly enclosed in said member and defined by all parts of the member. It has the shape of a prism of square cross section extending longitudinally of said member 10 and terminating in pyramid-shaped ends. The line of symmetry of the prism substantially coincides with the line of intersection of the planes dividing the member into four parts. The chamber accommodates the spreading-apart means 15, 15 which are formed as balls, and also a small ball 16. The prism-shaped portion of the chamber is of such a size that the two large balls 15, 15 can lie beside one another while the small ball 16 is so arranged as to bear against the two large balls 15, 15 and also against the screw 13. When screwed inwards the screw 13 will urge the small ball 16 downwards and said ball in turn will move the two large balls 15, 15 apart and urge them each into one of the tapering portions of the chamber, whereby the parts 10 of the member will be spread apart. The end of the screw 13 bearing against the ball 16 is cup-shaped, and at the outer end the screw has a hexagon hole for a key which can be inserted in the hole through an opening 17 in one of the tubular elements 2, 3. When the two tubular elements 2 and 3 to be interconnected and interlocked have been pushed over the expanding device and are in end-to-end abutting relationship the opening in the tubular element will register with the screw which is thus screwed inwards by means of a hexagon key to spread apart the parts 10 into application with the walls of the tubular elements so that these are interconnected and interlocked. In this way there is provided between the elements a connection totally devoid of projecting parts and being invisible from outside, except for the opening in one of the tubular elements. As the expanding device engages substantially the entire surface of the inner walls of the tubular elements at the end portions of the latter the connection will be exceptionally strong and stable.

FIG. 6 shows a section of an expanding device which is partly constructed in the same way. To determine the point where it is desired that the spreading-apart means engage the converging portion of the chamber, use can be made of elongated spreading-apart means 18 having spherical ends. In the example shown in the drawing the device is so constructed that the parts 10 of the expanding member engage the spreading-apart means 18 at the middle of the portion inserted in the respective tubular elements. The screw 19 having a spherical point to engage the spreading-apart means is here substituted for the ball 16 employed in the embodiment shown in FIG. 4. The spreading-apart means, the chamber, the screw and further means arranged between said parts can be designed in several other ways without departing from the scope of the invention. Thus the point of the screw can be made conical and the spreading-apart means can be given pointed ends.

In lieu of the opening in one of the tubular elements 2 and 3 in register with the screw 13 there may be provided a slot which extends longitudinally of the tubular element and substantially is of the same length as half the expanding device. By the provision of this slot the device can be wholly inserted in one tubular element so as not to constitute any obstacle when e.g. a stand assembly has been erected and a length of tube is to be inserted between two other opposed tube lengths the ends of which are spaced apart a distance corresponding to the tube length to be inserted.

In lieu of spring clips the parts of the member 10 can be kept together by means of rivets disposed in holes in said parts and permitting the parts to move in relation to each other to a restricted extent.

In the embodiment shown in FIGS. 7 and 8 the expanding member 20 is divided along the planes of division by two cuts 21 and 22 starting from opposite end surfaces and not cutting it through altogethher. As a result, the expanding member on the one hand will not be divided into a number of parts but be kept together by the uncut portions 23 and 24 instead of by spring clips or rivets. On the other hand, the expansibility of the member is insured by the resilient properties of the material. Provided in the member 20 is a longitudinally extending bore 25 the bottom of which is conical and in which is inserted a spreading-apart means 26. This means 26 may have the shape illustrated in FIG. 8 or some other suitable shape, for instance that illustrated in FIG. 6. Inserted in a threaded bore in hte member is a screw 27 which has a conical or round point with which to actuate the spreading-apart means 26.

The expanding device shown in FIGS. 7 and 8 is for use at the interconnection of a tube of square cross-sectional shape and a tube of round cross-sectional shape, for which reason the right-hand end in the figures is of square cross-sectional shape while the left-hand end is of round cross-sectional shape. Of course, all of the members may also have the same cross-sectional shape.

To realize a connection device for hollow structural elements which is suited for heavier shelving and stand assemblies, the interconnection is effected—according to a modification of the invention shown in FIG. 9—with the aid of an interlocking element 29 which is provided at suitable points with threaded holes 28 and which is inserted between the structural elements to be interconnected and interlocked. Same as in the earlier described embodiments a suitably divided expanding member 30 is mounted in a hollow structural element 31. The spreading-apart means 32 in said expanding member is provided at one conical end with a threaded pin 33 for connection with the interlocking element 29 and at the other conical end with gear-like knurls 34 coacting with corresponding knurls at the conical portion 35 of a spreading-apart pin 36 which is disposed in a hole in the expanding member and for guiding purposes extends downwards in the prolongation of said hole into the lower portion of the expanding member. The pin 36 is rotated with the aid of a hexagon key. The hole in the expanding member is threaded to receive a screw 37 having a hexagonal though hole for a hexagon key larger than that used for rotation of the spreading-apart pin.

At the mounting a hollow structural element 31 is assembled with the interlocking element 29, and the expanding member 30 is brought in contact with said interlocking element. The screw 37 is screwed on top of the pin 36 in such a way that the pin is easily rotatable with the aid of a hexagon key. At said rotation also the spreading-apart means 32 is rotated, and the threaded pin 33 is screwed as firmly as possible into the hole 28 of the interlocking element 29. The screw 37 is then so firmly tightened that the pin 36 is pressed down, driving the spreading-apart means to the left as viewed in FIG. 9 and expanding the member 30 by means of the conical ends. Other structural elements can then be fastened to the same interlocking element.

What I claim and desire to secure by Letters Patent is:

1. In combination with a structural member having a first passage; an expanding device including an expandable member including at least two parts received in said first passage for radial movement between expanded and retracted positions, said expandable parts having means defining a second longitudinal passage of generally uniform cross section throughout and generally coaxial with said first passage, said expanded parts further having at one end of said second passage cam surfaces extending at an angle to the axis of said passages, an expander element received in said second passage for longtudinal slidable movement along said axis into engagement with said cam surfaces for expanding said parts, one of said parts having a radially extending threaded passage communicating with said second passage, an actuating screw threaded in said threaded passage to engage one end of said expander element to force the same into engagement with said cam surfaces to radially expand said parts into engagement with said structural member upon advancement of said actuating screw.

2. In combination with a structural member having a first passage; an expanding device including an expandable member including at least two parts received in said first passage for radial movement between expanded and retracted positions, said expandable parts having means defining a passage generally coaxial with said first passage and at least two pairs of oppositely positioned cam surfaces extending at an angle to the axis of said passages, two expander ball elements received in said second passage for slidable movement along said axis into engagement with said cam surfaces respectively for expanding said parts, a screw actuating means extending into said second passage at an angle to said axis thereof and having a depression in one end thereof, a pressure transmitting ball received in said depression in engagement with both of said expander ball elements to force the expander ball elements into engagement with said cam surfaces to radially expand said parts into engagement with said structural member upon advancement of said actuating screw means.

3. In combination with a structural member having a first passage; an expanding device including an expandable member including two parts received in said first passage for radial movement between expanded and retracted positions, said expandable parts having means defining a passage generally coaxial with said first passage and at least two pairs of oppositely positioned cam surfaces extending at an angle to the axis of said passages, two expander pins having spherical end surfaces received in said second passage for slidable movement along said axis into engagement with said cam surfaces respectively for expanding said parts, an actuating screw means threaded in one of said expandable parts and having a spherical end engaged against the adjacent ends of said pins for sliding said pins into engagement with said cam surfaces to radially expand said parts into engagement with said structural member upon advancement of said screw means.

4. In combination with a structural member having a first passage; an expanding device including an expandable member including at least two parts received in said first passage for radial movement between expanded and retracted positions, said expandable parts having means defining a passage generally coaxial with said first passage and cam surfaces extending at an angle to the axis of said passages, an expander element received in said second passage for slidable movement along said axis and into engagement with said cam surfaces for expanding said parts, and actuating means extending into said second passage at an angle to said axis thereof for engaging said expander element to slide it along said second passage into engagement with said cam surfaces to radially expand said parts into engagement with said structural member, said actuating means including a screw threaded in one of said expandable parts, said expander element having a conical end surface adjacent said screw, and said screw having a conical end surface engaged against the conical end surface of said expander element.

References Cited

UNITED STATES PATENTS

| 2,249,162 | 7/1941 | Nielsen | 287—111 |
| 2,960,342 | 11/1960 | Raper | 287—124 |
| 3,313,199 | 4/1967 | Houvener et al. | |
| 1,926,798 | 9/1933 | Baumbach | 279—2 |
| 2,250,631 | 7/1941 | Groene et al. | 279—2 |
| 2,499,781 | 3/1950 | Rothenberger | 279—2 |
| 3,059,514 | 10/1962 | Lindemann | 279—2 |

FOREIGN PATENTS

| 548,983 | 7/1956 | Belgium. |
| 74,046 | 11/1944 | Czechoslovakia. |
| 708,055 | 4/1931 | France. |
| 1,191,182 | 8/1962 | Germany. |

EDWARD C. ALLEN, *Primary Examiner.*

W. L. SHEDD, *Assistant Examiner.*

U.S. Cl. X.R.

52—585, 726; 279—2; 287—127, 20.92

U.S. DEPARTMENT OF COMMERCE
PATENT OFFICE
Washington, D.C. 20231

UNITED STATES PATENT OFFICE
CERTIFICATE OF CORRECTION

Patent No. 3,437,362                                                              April 8, 1969

Adrian Gottfried Offenbroich

It is certified that error appears in the above identified patent and that said Letters Patent are hereby corrected as shown below:

In the heading to the printed specification, lines 6 and 7, cancel "Claims priority, application Sweden, Mar. 20, 1965, 3,628/65".

Signed and sealed this 14th day of April 1970.

(SEAL)
Attest:

Edward M. Fletcher, Jr.                             WILLIAM E. SCHUYLER, JR.
Attesting Officer                                                    Commissioner of Patents